United States Patent
Sui et al.

(10) Patent No.: US 12,436,518 B2
(45) Date of Patent: Oct. 7, 2025

(54) METHOD, DEVICE, EQUIPMENT, AND STORAGE MEDIUM FOR AIRCRAFT TOOLING MODIFICATION

(71) Applicant: CHENGDU AIRCRAFT INDUSTRIAL (GROUP) CO., LTD., Sichuan (CN)

(72) Inventors: Shaochun Sui, Chengdu (CN); Xiaohua Li, Chengdu (CN); Juanying Guo, Chengdu (CN); Zhengxin Zhang, Chengdu (CN); Weicong Liang, Chengdu (CN); Mingdong Yang, Chengdu (CN); Qianbao Deng, Chengdu (CN); Xudan Zhou, Chengdu (CN); Mengshan Huo, Sichuan (CN)

(73) Assignee: CHENGDU AIRCRAFT INDUSTRIAL (GROUP) CO., LTD., Chengdu (CN)

( * ) Notice: Subject to any disclaimer, the term of this patent is extended or adjusted under 35 U.S.C. 154(b) by 0 days.

(21) Appl. No.: 19/087,438

(22) Filed: Mar. 21, 2025

(65) Prior Publication Data
US 2025/0264861 A1 Aug. 21, 2025

Related U.S. Application Data

(63) Continuation-in-part of application No. PCT/CN2023/101082, filed on Jun. 19, 2023.

(30) Foreign Application Priority Data

Sep. 21, 2022 (CN) .......................... 202211149305.X

(51) Int. Cl.
*G05B 19/4093* (2006.01)
*G06F 30/15* (2020.01)

(52) U.S. Cl.
CPC ....... *G05B 19/40938* (2013.01); *G06F 30/15* (2020.01); *G05B 2219/35082* (2013.01)

(58) Field of Classification Search
None
See application file for complete search history.

(56) References Cited

U.S. PATENT DOCUMENTS 5,033,014 A * 7/1991 Carver .................... G06T 17/00
700/86
2014/0079053 A1 3/2014 Gallimore et al.

FOREIGN PATENT DOCUMENTS

CN 104361436 A 2/2015
CN 107464075 A 12/2017
(Continued)

OTHER PUBLICATIONS

International Search Report in PCT/CN2023/101082 mailed on Jul. 24, 2023, 6 pages.
(Continued)

*Primary Examiner* — Ryan A Jarrett
(74) *Attorney, Agent, or Firm* — PORUS IP LLC

(57) ABSTRACT

The present disclosure provides a method, device, equipment, and storage medium for aircraft tooling modification. The method includes generating, based on a modified design plan of a target aircraft, a tooling change order and a modified manufacturing bill of materials, performing, based on an initial design plan for the target aircraft, a tooling design for the tooling to obtain a design model; obtaining, based on the design model and a structural relationship of the tooling, a tooling bill of materials; modifying, based on the tooling change order, the tooling bill of materials to obtain a modified tooling bill of materials; establishing an association relationship between the modified manufacturing bill of materials and the modified tooling bill of materials; generating, based on the association relationship and
(Continued)

the modified tooling bill of materials, a fabrication outline, and obtaining a modified tooling based on the fabrication outline.

10 Claims, 4 Drawing Sheets

(56) References Cited

FOREIGN PATENT DOCUMENTS

| CN | 108121874 A | 6/2018 |
|---|---|---|
| CN | 110889608 A | 3/2020 |
| CN | 111460575 A | 7/2020 |
| CN | 113269439 A | 8/2021 |
| CN | 113334799 A | 9/2021 |
| CN | 113449033 A | 9/2021 |
| CN | 114662734 A | 6/2022 |
| CN | 114782012 A | 7/2022 |
| CN | 114896701 A | 8/2022 |
| CN | 114911511 A | 8/2022 |
| CN | 115222376 A | 10/2022 |

OTHER PUBLICATIONS

Written Opinion in PCT/CN2023/101082 mailed on Jul. 24, 2023, 9 pages.
Chen, Jing, Research on MES System for A Aviation Manufacturer, Full-text Database of Excellent Master's Dissertations in China (Information Technology Series), 2015, 50 pages.
Yang, Wentao, Research on Data Integration and Change of Manufacturing Engineering of Composite MES Products, Full-text Database of Excellent Master's Dissertations in China (Information Technology Series), 2011, 68 pages.
First Office Action in Chinese Application No. 202211149305.X mailed on Oct. 28, 2022, 15 pages.
Notification to Grant Patent Right for Invention in Chinese Application No. 202211149305.X mailed on Nov. 29, 2022, 2 pages.

* cited by examiner

ID, DEVICE, EQUIPMENT, AND STORAGE MEDIUM FOR AIRCRAFT TOOLING MODIFICATION

CROSS-REFERENCE TO RELATED APPLICATIONS

This application is a continuation-in-part of International Application No. PCT/CN2023/101082, filed on Jun. 19, 2023, which claims priority to Chinese Application No. 202211149305. X, filed on Sep. 21, 2022, the entire contents of each of which are incorporated herein by reference.

TECHNICAL FIELD

The present disclosure relates to the field of aerospace manufacturing, and particularly to a method, apparatus, device, and storage medium for aircraft tooling modification.

BACKGROUND

In the aircraft manufacturing process, the development task of the aircraft and its associated manufacturing of process equipment tend to be relatively independent, and the process equipment is developed before the aircraft enters the formal manufacturing process. In the process of tooling development, if the technical requirements and the drawing information corresponding to the aircraft are modified, and the modification involves the adjustment of the tooling process requirements, it is necessary to carry out planning and implementation for the modification documents of the original tooling. At the same time, if there is a tooling failure in the process of manufacturing or delivering to the user unit due to factors such as human operation or processing conditions during the manufacturing process of the aircraft, it is necessary for the process personnel to re-evaluate the effect of this tooling failure on the tooling in the subsequent product assembly process, if the tooling failure has an impact on the quality of the assembled product has an impact, it is also necessary to carry out planning and implementation for the modification document of the original tooling.

But in the modification planning of the tooling, a matching degree of the modified tooling and the aircraft is low, which can easily lead to the re-maintenance of the aircraft to make the aircraft manufacturing time and cost increase, and the use of the wrong tooling affects the quality of the aircraft and even causes accidents.

SUMMARY

The main purpose of the present disclosure is to provide a method, device, equipment, and storage medium for aircraft tooling modification, intended to solve the technical problem of a low matching degree between the modified tooling and the aircraft.

In order to achieve the above purpose, the present disclosure provides the method for aircraft tooling modification comprising: generating, based on a modified design plan of a target aircraft, a tooling change order and a modified manufacturing bill of materials, including: generating, based on the modified design plan of the target aircraft, an engineering change order and the modified manufacturing bill of materials; evaluating, based on the engineering change order, a tooling of the target aircraft and generating a manufacturing change order; and generating, based on the manufacturing change order, the tooling change order, wherein the modified design plan includes plans for a plurality of toolings, the tooling change order includes modification information for making modification to a technical condition of an existing tooling, and the modification information is obtained by analyzing and extracting information from the modified design plan for the target aircraft; performing, based on an initial design plan for the target aircraft, a tooling design for the tooling to obtain a design model; obtaining, based on the design model and a structural relationship of the tooling, a tooling bill of materials; modifying, based on the tooling change order, the tooling bill of materials to obtain a modified tooling bill of materials, wherein the tooling bill of materials is generated based on the initial design plan for the target aircraft; establishing an association relationship between the modified manufacturing bill of materials and the modified tooling bill of materials; generating, based on the association relationship and the modified tooling bill of materials, a fabrication outline, including: obtaining a tooling structure tree by listing a tooling top level node in the modified tooling bill of materials and a tooling node used under the tooling top level node; and generating the fabrication outline based on an unfolded tooling structure tree and the association relationship; and obtaining a modified tooling based on the fabrication outline.

In addition, in order to achieve the above purposes, the present disclosure further provides the device for aircraft tooling modification, comprising:

a tooling change order generating module, configured to generate, based on a modified design plan of a target aircraft, a tooling change order and a modified manufacturing bill of materials, wherein to generate, based on the modified design plan of the target aircraft, the tooling change order and the modified manufacturing bill of material, the tooling change order generating module is further configured to: generate, based on the modified design plan of the target aircraft, an engineering change order and the modified manufacturing bill of materials; evaluate, based on the engineering change order, a tooling of the target aircraft and generate a manufacturing change order; and generate, based on the manufacturing change order, the tooling change order, wherein the modified design plan includes plans for a plurality of toolings, the tooling change order includes modification information for making modification to a technical condition of an existing tooling, and the modification information is obtained by analyzing and extracting information from the modified design plan for the target aircraft;

a tooling bill of materials generating module, configured to perform, based on an initial design plan for the target aircraft, a tooling design for the tooling to obtain a design model; and obtain, based on the design model and a structural relationship of the tooling, a tooling bill of materials;

a tooling bill of materials modification module, configured to modify, based on the tooling change order, the tooling bill of materials to obtain a modified tooling bill of materials, wherein the tooling bill of materials is generated based on the initial design plan for the target aircraft;

an association relationship establishment module, configured to establish an association relationship between the modified manufacturing bill of materials and the modified tooling bill of materials;

a fabrication outline generating module, configured to generate, based on the association relationship and the modified tooling bill of materials, a fabrication outline, wherein to generate, based on the association relationship and the modified tooling bill of materials, the fabrication outline, the fabrication outline generating module is further configured to: obtain a tooling structure tree by listing a tooling top level node in the modified tooling bill of materials and a tooling node used under the tooling top level node; and generate the fabrication outline based on an unfolded tooling structure tree and the association relationship;

a modified tooling acquisition module, configured to obtain a modified tooling based on the fabrication outline.

In addition, in order to achieve the above purposes, the present disclosure further provides a computer device comprising a memory and a processor, wherein the memory stores a computer program, and the processor executes the computer program to implement the above method.

Figure 1:
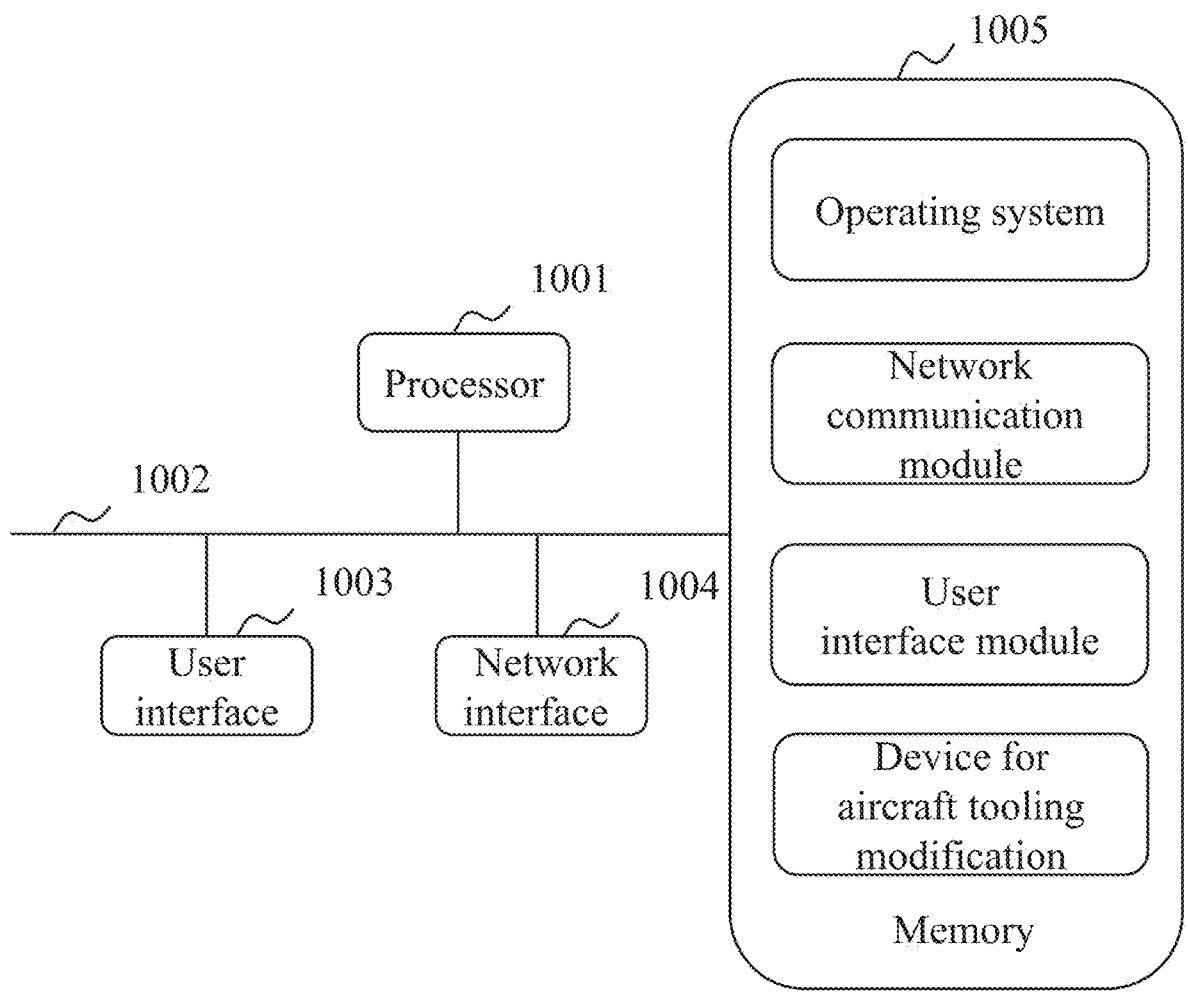
FIG. 1 is a schematic diagram illustrating an exemplary structure of a computer device for a hardware operating environment according to some embodiments of the present disclosure.

The realization of the purpose of the present disclosure, the functional features and the advantages will be further described in connection with the embodiments and with reference to the accompanying drawings.

DETAILED DESCRIPTION

It should be understood that the specific embodiments described herein are intended only for the purpose of interpreting the present disclosure, and are not intended to limit it.

The main solution of an embodiment of the present disclosure is a method, device, equipment, and storage medium for aircraft tooling modification, the method including: generating, based on a modified design plan of a target aircraft, a tooling change order and a modified manufacturing bill of materials, including: generating, based on the modified design plan of the target aircraft, an engineering change order and the modified manufacturing bill of materials; evaluating, based on the engineering change order, a tooling of the target aircraft and generating a manufacturing change order; and generating, based on the manufacturing change order, the tooling change order, wherein the modified design plan includes plans for a plurality of toolings, the tooling change order includes modification information for making modification to a technical condition of an existing tooling, and the modification information is obtained by analyzing and extracting information from the modified design plan for the target aircraft; performing, based on an initial design plan for the target aircraft, a tooling design for the tooling to obtain a design model; obtaining, based on the design model and a structural relationship of the tooling, a tooling bill of materials; modifying, based on the tooling change order, the tooling bill of materials to obtain a modified tooling bill of materials, wherein the tooling bill of materials is generated based on the initial design plan of the target aircraft; establishing an association relationship between the modified manufacturing bill of materials and the modified tooling bill of materials; generating, based on the association relationship and the modified tooling bill of materials, a fabrication outline, including: obtaining a tooling structure tree by listing a tooling top level node in the modified tooling bill of materials and a tooling node used under the tooling top level node; and generating the fabrication outline based on an unfolded tooling structure tree and the association relationship; and obtaining a modified tooling based on the fabrication outline. More descriptions regarding this section may be found elsewhere in the present disclosure, e.g., FIG. 2 and FIG. 3 and related descriptions.

In the prior art, in the process of aircraft manufacturing, the development task of the aircraft and its associated manufacturing of the process equipment tend to be relatively independent, and the process equipment is developed before the aircraft enters into a formal manufacturing process. In the process of tooling development, if the technical requirements and drawing information corresponding to the aircraft are modified, and the modification involves the adjustment of the tooling process requirements, it is necessary to carry out planning and implementation for the modification documents of the original tooling. At the same time, if there is a tooling failure in the process of manufacturing or delivering to the user unit due to factors such as human operation or processing conditions during the manufacturing process of the aircraft, it is necessary for the process personnel to re-evaluate the effect of this tooling failure on the tooling in the subsequent product assembly process, if the tooling failure has an impact on the quality of the assembled product, it is also necessary to carry out planning and implementation for the modification document of the original tooling. The modification document is a document that directs a modification to the original tooling.

But in the modification planning of the tooling, a matching degree of the modified tooling and the aircraft is low, which can easily lead to the return for the repair of the aircraft to make the aircraft manufacturing time and cost increase, and the use of the wrong tooling affects the quality of the aircraft and even causes accidents.

To this end, the present disclosure provides a solution for making a modification description of the technical conditions of an existing tooling process by generating a tooling change order to correlate the modification content of the tooling with a modified design plan of the target aircraft, improving the matching degree thereof. At the same time, a modified tooling bill of materials that includes the modification information of the tooling and the hierarchical relationship between the corresponding materials is generated, which improves the matching degree between the tooling and the modified design plan of the target aircraft. By establishing the association relationship between the modified manufacturing bill of materials and the modified tooling bill of materials, the process of modifying the process equipment and the manufacturing process of the aerospace product are effectively correlated to ensure that the relevant process requirements for tooling and the corresponding design requirements of the aerospace product are matched, resulting that a modified tooling has a higher matching degree with the modified design plan of the target aircraft, which improves the quality and efficiency of the overall development of the aircraft.

Referring to FIG. 1, FIG. 1 is a schematic diagram illustrating an exemplary structure of a computer device for a hardware operating environment according to some embodiments of the present disclosure.

In some embodiments, as shown in FIG. 1, the computer device includes: a processor 1001, such as a central processing unit (CPU), etc., a communication bus 1002, a user interface 1003, a network interface 1004, and a memory 1005. The communication bus 1002 is used to enable connected communication between these components. The user interface 1003 may include a display, an input unit such as a keyboard, etc., and optionally the user interface 1003 may also include a standard wired interface, a wireless interface, etc. Optionally, the network interface 1004 may include a standard wired interface, a wireless interface (e.g., a wireless-fidelity (WI-FI) interface), etc. The memory 1005 may be a high-speed Random Access Memory (RAM) memory or a stable Non-Volatile Memory (NVM), such as a disk memory, or the like. The memory 1005 optionally may also be a storage device independent of the aforementioned processor 1001.

The person skilled in the art will appreciate that the structure illustrated in FIG. 1 does not constitute a limitation of the computer device, and may include more or fewer components than illustrated, or a combination of certain components, or a different arrangement of components.

In some embodiments, as shown in FIG. 1, the memory 1005, as a storage medium, may include an operating system, a data storage module, a network communication module, a user interface module, and an electronic program.

In some embodiments, in the computer device as shown in FIG. 1, the network interface 1004 is mainly used for data communication with a network server; the user interface 1003 is mainly used for data interaction with a user; the processor 1001 and the memory 1005 of the computer device of the present disclosure may be provided in the computer device, and the computer device calls the device for aircraft tooling modification stored in the memory 1005 through the processor 1001, and executes the method for aircraft tooling modification provided by the embodiments of the present disclosure.

Figure 2:
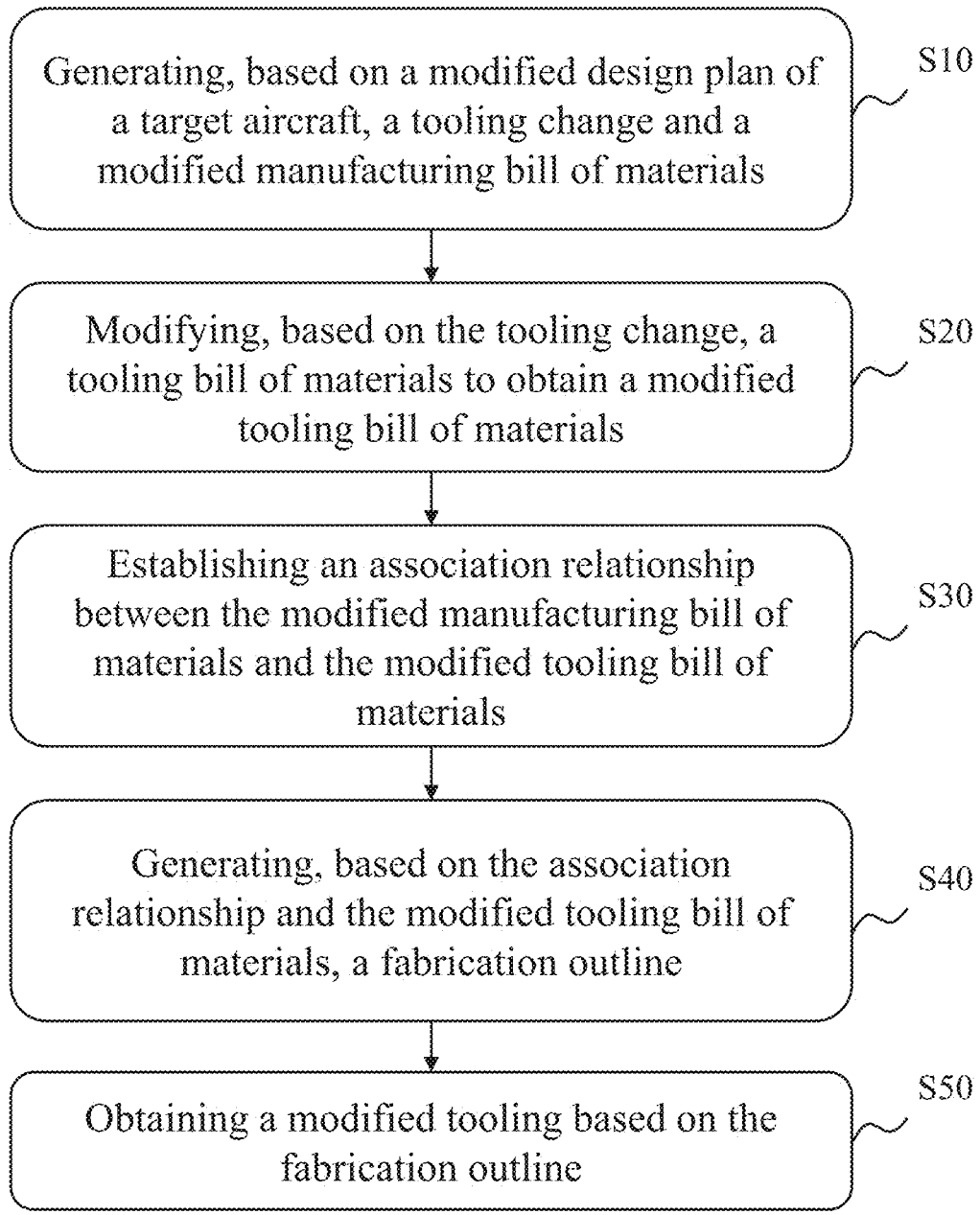
FIG. 2 is a flowchart illustrating an exemplary process for aircraft tooling modification according to some embodiments of the present disclosure.

FIG. 2 is a flowchart illustrating an exemplary process for aircraft tooling modification according to some embodiments of the present disclosure.

Referring to FIG. 2, based on the hardware device of the foregoing embodiment, embodiments of the present disclosure provide a method for aircraft tooling modification, the method being performed by a processor in a computer device, including the following steps.

S10: generating a tooling change order and a modified manufacturing bill of materials based on a modified design plan of the target aircraft.

The modified design plan includes plans (e.g., adjustment plans, etc.) regarding a plurality of toolings. The tooling is a component or part, etc., that constitutes the target aircraft. The target aircraft is an aircraft for which the corresponding tooling is modified.

In some embodiments, the design or process of structural components (also known as toolings) is often modified or changed during the production and development of the aircraft, and the modified design plan is a design plan obtained by adjusting an original design plan of the target aircraft. The design plan is a plan that includes an overall process for producing the target aircraft and required toolings. The original design plan is available through the memory.

In some embodiments, a plurality of toolings are involved in the development of the aircraft, so the modified design plan also includes a plan for designing or adapting the relevant toolings for the target aircraft.

In some embodiments, the processor extracts information related to the tooling modification in the design or adjustment plan based on the design or adjustment plan for the tooling in the modified design plan, to obtain the tooling change order for the tooling and the modified manufacturing bill of materials. The information related to tooling modification includes modification information about technical condition of an existing tooling (e.g., modification to tooling structure, function, materials, etc.) and materials required to manufacture the tooling that needs to be modified.

The modified manufacturing bill of materials refers to a manufacturing bill of materials (MBOM) that corresponds to the design or adjustment plan of the tooling in the modified design plan.

In some embodiments, a manufacturing bill of materials includes an assembly sequence of structural parts (also known as toolings), man-hour quotas, material quotas, and related tooling information such as equipment, cutters, clamps, and molds. The manufacturing bill of materials is capable of reflecting the parts (or components), fittings, and manufacturing process and the assembly sequence of an end product (i.e., assembled completed toolings). The man-hour quota is the time required to produce the tooling. The material quota is an amount of material required to produce the tooling.

In some embodiments, the processor counts the materials required to manufacture the tooling that needs to be modified in the modified design plan, and adjusts an original manufacturing bill of materials (e.g., add new materials, delete materials that are no longer required, and adjust quantities and specifications of existing materials, etc.) by combining the modification information to obtain a modified manufacturing bill of materials.

In some embodiments, the tooling change order includes modification information that modifies the technical condition of the existing tooling. The processor may analyze and extract information from the modified design plan for the target aircraft to obtain the modification information and convert the modification information into the tooling change order.

In some embodiments, instruction information included in the tooling change order is obtained through a modified design plan of the target aircraft, which makes the modified tooling obtained by subsequent production match the target aircraft to a better extent. The modified tooling refers to a tooling obtained by production after a design of an original tooling is modified.

In some embodiments, it often occurs in actual production that the tooling is damaged during manufacturing and warehousing due to accidental factors, such as human operation and the natural environment, and the damaged tooling is subjected to a rework or scrap treatment. When repairing the damaged tooling, a modification to the damaged tooling does not relate to a modification to the original design plan of the target aircraft, and the processor generates the tooling change order based on the design content of the original design plan of the target aircraft and maintenance information of the damaged tooling to carry out the subsequent maintenance and manufacturing. The maintenance information refers to information related to the repair of the tooling, such as the duration of the repair and the difficulty of the repair. The maintenance information is obtained through the memory.

In some embodiment, the modified manufacturing bill of materials includes parts, assemblies corresponding to the modified tooling, and a manufacturing process for the end product. The parts corresponding to the modified tooling are base parts that make up the modified tooling, such as bearings, gears, etc. The assembly corresponding to the modified tooling is a component that is assembled from parts corresponding to the modified tooling. The end product is the modified tooling that is assembled from the assemblies corresponding to the modified tooling. The processor may extract information about the parts, the assemblies, and the end product corresponding to the modified tooling from the information related to the tooling modification in the modified design plan and count the parts, the assemblies, and the end product in the modified manufacturing bill of materials.

In some embodiments, the modified manufacturing bill of materials is a manufacturing bill of materials (MBOM) corresponding to the modified design plan. The manufacturing bill of materials is obtained by a manufacturing department after a detailed design of a process assembly step based on an engineering bill of materials (EBOM). The manufacturing bill of materials mainly describes tooling information, such as the assembly sequence of the product, the man-hours quota, the material quota, and related information of equipment, tools, clamps, molds, etc., including the parts and the fittings of the tooling, and a manufacturing process, such as a manufacturing manner, the assembly sequence, etc., of the end product, reflecting the reasonable flow of materials between the production plant and the process of consumption.

In some embodiments, the processor may generate the tooling change order and the modified manufacturing bill of materials based on the modified design plan for the target aircraft through following operations.

The processor generates an engineering change order and the modified manufacturing bill of materials based on the modified design plan of the target aircraft. The processor may evaluate the tooling and generate a manufacturing change order based on the engineering change order, and generate the tooling change order based on the manufacturing change order.

In some embodiments, the processor defines product data for the target aircraft based on detailed requirements of the modified design plan, and generates the engineering bill of materials (EBOM) that includes information such as material information, product name, product structure, breakdown, summary, product instruction manual, packing list, etc. The engineering bill of materials is a basis for the product data required by subsequent departments such as a process department and a manufacturing department. The manufacturing department carries out the manufacturing of the aircraft by generating a manufacturing bill of materials (MBOM) (i.e., a modified manufacturing bill of materials) based on a detailed design of the assembly steps of the process based on the engineering bill of materials.

In some embodiments, the processor obtains design modification information regarding technical conditions, resource constraints, malfunctioning issues, etc., based on the modified design plan. The engineering change order (ECO) is used to describe and carry the design modification information. The manufacturing unit obtains the manufacturing change order (MCO) based on modification evaluation to the manufacturing of the tooling based on the ECO.

In some embodiments, the modification evaluation to the manufacturing of the tooling includes evaluating process feasibility, economic feasibility, time feasibility, etc. The evaluation of process feasibility includes evaluating whether an existing process supports the tooling modification, whether a new process or equipment needs to be introduced, etc. The evaluation of economic feasibility includes estimating the cost of the tooling modification, including material cost, manufacturing cost, equipment upgrade cost, etc. The evaluation of time feasibility includes estimating the manufacturing time required for the tooling modification, whether impacts the production schedule, etc.

In some embodiments, the processor specifies, based on the ECO and a result of the modification evaluation to the manufacturing of the tooling, the specific content (including size, shape, material, process, etc.) of the tooling modification, develops an implementation plan (including specific operation steps and required resources), and converts the implementation plan into the manufacturing change order.

The manufacturing change order includes modification information of the process technology of the tooling. If a tooling needs to be modified after the modification evaluation to the manufacturing of the tooling, the processor generates a tooling change order (TCO) based on the modification information in the MCO. The tooling change order includes descriptions of modifications made to the process technology conditions of the existing tooling.

In some embodiments, the manufacturing of modified tooling solely based on and constrained by an existing technical order (TO) for tooling processes fails to establish associations with information such as assembly steps in the aircraft manufacturing process, resulting in a low matching degree between the modified tooling and the target aircraft, and leading to production resource waste and extended aircraft development timelines due to frequently tooling rework and factory returns. The technical order (TO) refers to a process document describing a tooling assembly, manufacturing of tooling part components, inspection procedures, and corresponding technical requirements developed based on tooling nodes and through a tooling process file editor (e.g., CAD software). The modification information included in the TCO is obtained by analyzing the modified design plan of the target aircraft and information extraction, which effectively improves the matching degree between the subsequently produced tooling and the target aircraft. The matching degree is data used to characterize a degree of match between the tooling or tooling parts and the modified design plan of the target aircraft.

In some embodiments, the matching degree is indicated by a value of 1 or 0, with a value of 1 indicating that the tooling or tooling parts match the modified design plan of the target aircraft, and a value of 0 indicating that the tooling or tooling parts do not match the modified design plan of the target aircraft.

In some embodiments, taking into account the production efficiency and the failure rate of the tooling or tooling parts during production, the matching degree also is expressed by a value greater than 0 and less than 1. The closer the matching degree is to 1, the greater the matching degree between the tooling or tooling part and the modified design plan of the target aircraft.

In some embodiments, before modifying the tooling bill of materials according to the tooling change order to obtain the modified tooling bill of materials, the processor further performs following operations.

The processor performs a tooling design of the tooling according to an initial design plan of the target aircraft, obtains a design model, and obtains a bill of materials for the tooling based on the design model and a structural relationship of the tooling. The design model may be a three-dimensional model characterizing spatial structural relationships between toolings. The processor obtains the structural relationships of the toolings by analyzing and extracting information from the initial design plan.

In some embodiments, the processor uses a design tool (e.g., SolidWorks, AutoCAD, etc.) to design a plurality of toolings individually based on the information (e.g., dimensions, shapes, etc.) associated with the toolings in the initial design plan to obtain a design module corresponding to the plurality of toolings. The processor uses the design tool to combine the design module corresponding to the plurality of toolings to obtain the design model according to the information related to the toolings in the initial design plan (such as the connection mode, use environment, function of the toolings, etc.).

In some embodiments, a tooling bill of materials (TBOM) is a list used to define relationships between material hierarchies to which a tooling or a tooling part belongs. The material hierarchy refers to a hierarchical relationship between toolings, e.g., a small tooling and a large tooling belong to different hierarchies, etc.

In some embodiments, the tooling bill of materials is represented by a tooling structure tree. The tooling structure tree is a tree structure that characterizes the hierarchical relationships between different toolings. In some embodiments, the tooling structure tree includes a tooling top level node and tooling nodes used under the tooling top level node.

The tooling top level node refers to a tooling node that is located at a topmost level in the tooling structure tree. The tooling node is a node that represents a tooling or a tooling part in the tooling structure tree. The tooling nodes used under the tooling top level node are all the tooling nodes extending downward from the tooling top level node in the tooling structure tree. The tooling nodes used under the tooling top level node may characterize all of the tooling(s) or tooling part(s) used that make up a corresponding tooling of the tooling top level node.

In some embodiments, the processor obtains a tooling design plan for the target tooling based on the initial design plan for the aircraft and performs tooling design in design software (e.g., CATIA, etc.) to obtain the design model based on the tooling design plan. The processor checks the design model and the structural relationship of the toolings into the corresponding tooling top level node by a check-in tool (e.g. model inspector, etc.) to obtain the TBOM.

S20: modifying, based on the tooling change order, the tooling bill of materials to obtain a modified tooling bill of materials.

In some embodiments, the processor identifies specific information in the TBOM that needs to be modified based on the modification information in the TCO, such as adding, deleting, changing, etc., certain node information (i.e., the tooling node and the information corresponding to the tooling node), and modifies and updates the TBOM structure (also referred to as the tooling structure tree), to obtain the modified TBOM structure, i.e., the modified tooling bill of materials. The modified tooling bill of materials refers to a list that defines a relationship between material hierarchies to which tooling parts corresponding to the modified tooling belong.

In some embodiments, the modified tooling bill of materials includes information about tooling modification due to design modifications or the quality of the tooling itself, and the hierarchical relationship between the tooling and the corresponding material. The hierarchical relationship is closely related to the modified design plan of the target aircraft, increasing the matching degree between the tooling manufactured subsequently and the modified design plan of the target aircraft.

S30: establishing an association relationship between the modified manufacturing bill of materials and the modified tooling bill of materials.

In some embodiments, the processor matches the manufacturing material information and the tooling material information related to the assembly process (i.e., the information related to the tooling material in the modified tooling bill of materials) based on the material information in the EBOM, and establishes the association relationship between the modified manufacturing bill of materials and the modified tooling bill of materials. The association relationship includes a correspondence between the tooling material in the modified tooling bill of materials and an assembly sequence in the modified manufacturing bill of materials.

In some embodiments, an effective association of the modified manufacturing bill of materials with the modified tooling bill of materials means that an effective association is established between the modification process of the process equipment and the manufacturing process of the aeronautical product, which ensures the matching degree between the relevant process requirements of the tooling and the design requirements of the corresponding aeronautical products, and thus improves the quality and efficiency of aircraft development.

In some embodiments, the processor establishes the association relationship between the modified manufacturing bill of materials and the modified tooling bill of materials, including: obtaining a material association rule based on the material information included in the modified manufacturing bill of materials and establishing the association relationship according to the material association rule. The material association rule refers to an association relationship between various materials defined in the modified manufacturing bill of materials, such as a connection relationship between various materials.

In some embodiments, the processor matches the manufacturing material information and the tooling material information related to the assembly process based on the material information in the EBOM, obtains the material association rule, associates the modified manufacturing bill of materials with the modified tooling bill of materials according to the material association rule, and obtains the association relationship.

S40: generating, based on the association relationship and the modified tooling bill of materials, a fabrication outline.

In some embodiments, a fabrication outline (FO) is a manufacturing outline that provides necessary manufacturing and tooling information for manufacturing parts and small sub-assemblies. The small sub-assemblies are small assembly units composed of a plurality of parts.

In some embodiments, the processor lists the tooling top level nodes and the used tooling nodes under the tooling top level node in the modified tooling bill of materials to obtain the tooling structure tree. The processor generates the FO based on the unfolded tooling structure tree and the association relationship. The fabrication outline may include material information such as materials, finished products, standard parts, etc., required in the manufacturing process of the tooling corresponding to the tooling top level node, and at the same time defines the manufacturing process, which is used to guide the manufacturing of the tooling. The standard parts are general-purpose parts produced in accordance with national or industry standards.

S50: obtaining a modified tooling based on the fabrication outline.

In some embodiments, the processor makes, based on the material information in the FO, a material distribution request to the warehouse through a network interface, and the manufacturing department performs tooling manufacturing to obtain the modified tooling based on the material distributed by the warehouse and the manufacturing information and process information (also referred to as the manufacturing process) in the FO. The manufacturing information includes the process technology for manufacturing the modified tooling, etc. More descriptions regarding the fabrication outline and the modified tooling may be found elsewhere in the present disclosure.

In some embodiments, after obtaining the modified tooling according to the fabrication outline, the processor further inspects the modified tooling based on the modified design plan by tooling inspection equipment. If an inspection result is qualified, the processor registers the modified tooling in a warehouse.

In some embodiments, after the manufacturing of the modified tooling is completed, the processor inspects whether the modified tooling meets the requirements in the modified design plan through the tooling inspection equipment, and if the modified tooling meets the requirements, the modified tooling passes the inspection and may be registered into the warehouse. After the registration, the modified tooling is delivered to the aircraft production line to complete the manufacturing of a corresponding part according to an arrangement.

In some embodiments, after inspecting the modified tooling based on the modified design plan, if the inspection result is unqualified, the processor generates the tooling change order to modify the modified tooling.

In some embodiments, if the modified tooling fails inspection, the processor is required to adjust the tooling according to the specific situation, generate a new tooling change order, and implement the process described above based on the tooling change order for the tooling, and carry out modified manufacturing of the modified tooling.

In some embodiments, the processor sends a first machining instruction to a manipulator and a numerically controlled machining apparatus (also referred to as computer numerical control (CNC) machine tool) via a processor in a computer based on the fabrication outline, for controlling the manipulator to grip and hold a tooling material, and controlling the numerically controlled machining apparatus to perform rough and finish machining to the tooling material to manufacture a tooling part.

The first machining instruction is an instruction that controls the numerically controlled machining apparatus to machine the tooling material. The first machining instruction includes material information, manufacturing information, and process information (also referred as to manufacturing processes) from the fabrication outline.

The manipulator is a device used to transfer the tooling material. The numerically controlled machining apparatus is a device for machining the tooling material. In some embodiments, both the manipulator and the numerically controlled machining apparatus are communicatively connected to the processor. The numerically controlled machining apparatus may include a CNC lathe, a CNC milling machine, a machining center, etc. The numerically controlled machining apparatus is provided with a variety of cutting tools for machining different kinds of tooling materials.

In some embodiments, the process of processing and manufacturing the tooling part includes that: after receiving the first machining instruction, the manipulator grips the tooling material corresponding to the material information in the first machining instruction and secures the tooling material to a machining area of the numerically controlled machining apparatus. In response to the tooling material being secured to the machining area, the numerically controlled machining apparatus selects one or more target tools (e.g., a turning tool, a milling tool, a drill bit, etc.) among a plurality of tools based on the manufacturing information and the process information in the first machining instruction, and calibrates the one or more target tools to locate initial positions of the one or more target tools. The numerically controlled machining apparatus determines motion parameters of the one or more target tools based on the manufacturing information and process information in the first machining instruction, and controls the one or more target tools in accordance with the motion parameters to carry out rough and finish machining of the tooling material. The rough machining includes cutting and/or drilling, etc., of the tooling material. The finish machining includes grinding and/or polishing lapping, etc., of the tooling material.

The target tool is a tool that is used to machine the tooling material corresponding to the material information. The motion parameters include a motion path, a rotational speed, a feed rate, a cutting speed, etc., of the target tool. The numerically controlled machining apparatus stores historical target tools corresponding to a variety of tooling material, and uses a historical target tool corresponding to a current tooling material as a current target tool. The historical target tool is a target tool used during historical machining.

In some embodiments, after the processing and manufacturing of the tooling part is completed, the processor sends a first assembly instruction to the manipulator and automated assembly equipment via the processor based on the fabrication outline, for controlling the manipulator to clamp the tooling part and to adjust a position and an angle of the tooling part, and controlling the automated assembly equipment to assemble the tooling part to obtain the modified tooling. The technician may test run and calibrate the automated assembly equipment before assembly.

The first assembly instruction is an instruction that controls the automated assembly equipment to assemble the tooling part. The first assembly instruction includes the tooling structure tree in the fabrication outline and the association relationship.

The automated assembly equipment is equipment that assembles the tooling part. In some embodiments, the automated assembly equipment is communicatively connected to the processor. The automated assembly equipment may include an automatic screw machine, a riveting machine, a welding machine, a hydraulic or pneumatic component, etc.

In some embodiments, the process of assembling the tooling part includes that: the manipulator receives a first assembly instruction, and clamps a plurality of tooling parts corresponding to tooling nodes in a same level of the tooling structure tree based on the tooling structure tree in the first assembly instruction, and determines positions and angles of the plurality of tooling parts based on the association relationship in the first assembly instruction.

The automated assembly equipment (e.g., the automatic screw machine, the riveting machine, and the welding machine) determines assembly parameters and assembly locations based on the association relationship in the first assembly instruction, and performs screw connection, riveting, or welding on the plurality of tooling parts in accordance with the assembly parameters and assembly locations. After the plurality of tooling parts are connected, the automated assembly equipment (e.g., the hydraulic or pneumatic assembly) may press or perform chimerization on the plurality of tooling parts.

In some embodiments, the assembly location includes a screwed location, a riveted location, a welded area, etc. The assembly parameters include a drilling speed, a riveting length, a welding length, etc.

In some embodiments, the processor generates tooling sequencing information based on the fabrication outline, generates a second machining instruction and a second assembly instruction based on the tooling sequencing information, controls the numerically controlled machining apparatus to machine and manufacture the tooling part in accordance with the second machining instruction, and controls the automated assembly equipment to assemble the tooling part in accordance with the second assembly instruction.

The tooling sequencing information refers to an order of different part groups. The part group is a group of tooling parts that have an association relationship. The second machining instruction refers to an instruction that controls the numerically controlled machining apparatus to process and manufacture tooling parts within different part groups in accordance with the tooling sequencing information. The second assembly instruction refers to an instruction that controls the automated assembly equipment to assemble the tooling parts within different part groups in accordance with the tooling sequencing information.

In some embodiments, the processor obtains information related to a tooling part corresponding to a lowest tooling node according to the tooling structure tree in the fabrication outline, and labels tooling parts having an association relationship as a same part group according to the association relationship in the fabrication outline. The processor sorts the different part groups according to a count of tooling parts in each part group from the largest to the smallest and obtains the tooling sequencing information. The tooling parts that have an association relationship may be tooling parts to be machined with similar target tools, tooling parts having similar use or material, etc.

In some embodiments of the present disclosure, the machining efficiency and assembly efficiency of the tooling parts are ensured by sequential machining and assembling, and sufficient qualified tooling parts can be produced on time, to avoid delaying the production time due to the rework of the tooling parts and other circumstances.

In some embodiments, the processor also determines the tooling sequencing information based on the assembly sequence of the tooling.

The assembly sequence is a sequence that characterizes an assembly order of a plurality of tooling parts that make up a tooling. In some embodiments, the processor obtains a plurality of assembly sequences of the tooling based on the tooling structure tree and treats each assembly sequence as a part group. For example, in the tooling structure tree, a tree branch from top to bottom is tooling A, tooling part B, tooling part C, then the assembly sequence is (A, B, C), i.e., the tooling part C and other parts are assembled into the tooling part B, and the tooling part B and other parts are assembled into the tooling A. The other parts may be basic parts, such as bearings, gears, etc.

In some embodiments, for a part group corresponding to each assembly sequence, the processor identifies, in the fabrication outline, tooling parts of a same type as the tooling parts included in the part group, and obtains a count of tooling parts of the same type as a count of related parts. The tooling parts of the same type include tooling parts that have a same model number, a same material, etc.

In some embodiments, the processor sorts, based on the count of related parts corresponding to each part group, the plurality of part groups from largest to smallest in accordance with the count of related parts to obtain the tooling sequencing information.

In some embodiments, the processor also obtains an average historical matching degree for the plurality of tooling parts within the part group and calculates a ratio of the count of related parts corresponding to the part group to the corresponding average historical matching degree to obtain a weighted count of related parts for the part group. The processor sorts the plurality of part groups in ascending order according to the weighted count of related parts to obtain the tooling sequencing information. The average historical matching degree is an average of historical matching degrees of the tooling parts. The historical matching degree is an average of the matching degrees for a plurality of tooling parts of the same type in historical data.

In some embodiments of the present disclosure, the lower the average historical matching degree of the part group, the more difficult the matching of the tooling parts within the part group with the target aircraft, and the more difficult the machining is likely to be, and the prioritization of machining and assembly of the tooling parts within this type of parts can produce a sufficient number of tooling parts on time to avoid delaying the delivery time of the target aircraft due to rework and other circumstances.

In some embodiments, the processor obtains fault information during the processing and manufacturing of the plurality of tooling parts and abnormality information during assembly, and generates, based on the fault information and the abnormality information, a corresponding matching degree of the plurality of tooling parts and a total matching degree of the modified tooling. The processor sends, based on the total matching degree, an inspection instruction to the tooling inspection equipment, and controls the tooling inspection equipment to inspect the modified tooling and/or tooling parts. More descriptions regarding the matching degree may be found elsewhere in the present disclosure.

The fault information refers to information related to faults that occur when machining and manufacturing tooling parts. For example, a malfunction occurs while machining a tooling part on the numerically controlled machining apparatus, a difference between a dimension of the tooling part and a dimension required in the fabrication outline exceeds a difference threshold, and so on. The difference threshold is pre-set based on historical experience.

The abnormality information refers to information related to an abnormality that occurs while assembling a tooling part. For example, the tooling part cannot be assembled (also known as assembly interference) or an assembly time exceeds an assembly time threshold. The assembly time threshold is pre-set based on historical experience.

In some embodiments, a variety of sensors, such as sound sensors, vibration sensors, etc., may be disposed on the automated assembly equipment for capturing a volume and vibration amplitude during assembly. In response to at least one of the volume or vibration amplitude meeting an anomaly condition, the processor determines that the tooling part cannot be assembled. For example, the anomaly condition includes the volume being greater than a sound threshold or the vibration amplitude being greater than a vibration amplitude threshold. The sound threshold and vibration amplitude threshold are pre-set based on historical experience.

In some embodiments, a plurality of fault information and a plurality of abnormality information occur when producing the plurality of tooling parts of the same type.

The total matching degree of the modified tooling is estimated data of the matching degree between the modified tooling and the modified design plan for the target aircraft. In some embodiments, the processor uses an average of the matching degrees of all of the tooling parts that make up the modified tooling as the total matching degree of the modified tooling.

In some embodiments, the processor queries a reference matching degree corresponding to a total count of pieces of information in the preset matching table based on the fault information and the abnormality information of one type of tooling parts, and uses the reference matching degree as the matching degree as that type of tooling parts. In the above manner, the matching degrees corresponding to the plurality of tooling parts are determined. The total count of pieces of information is a sum of a count of pieces of the fault information and a count of the abnormality information.

In some embodiments, the preset matching table is pre-set based on historical data and includes a plurality of total counts of pieces of information and a reference matching degree corresponding to each total count of pieces of information. For example, the lower the total count of pieces of information, the higher the corresponding reference matching degree. The reference matching degree corresponding to the total count of pieces of information for which the matching degree exceeds an information count threshold is set to 0. The information count threshold may be set in advance based on historical experience.

In some embodiments, the processor also determines the total matching degree 450 based on a fault information sequence 410, an abnormality information sequence 420, and a type of the modified tooling 430 through a matching model 440.

The fault information sequence is a sequence consisting of fault information corresponding to all of the tooling parts that make up the modified tooling. The abnormality information sequence is a sequence consisting of abnormality information corresponding to all of the tooling parts that make up the modified tooling.

In some embodiments, the matching model is a machine learning model. For example, the matching model may include one or any combination of a long short-term memory (LSTM) model or other customized model structures.

In some embodiments, the processor may train the matching model based on a large number of first training samples with first labels, by a gradient descent method, etc. The first training sample includes a type of a sample tooling and a sample fault information sequence and a sample abnormality information sequence corresponding to the sample tooling, and the first label of the first training sample is a total matching degree corresponding to the sample tooling. In some embodiments, the first training samples are obtained based on historical data.

In some embodiments, the processor determines the first label based on an actual inspection result of the sample tooling in the historical data. For example, the first label is 0 if the actual inspection result of the sample tooling is a failure, and the first label is 1 if the actual inspection result of the sample tooling is a pass.

In some embodiments, the matching model is obtained by training in the following manner: inputting a plurality of training samples with training labels into an initial matching model, constructing a loss function by the training labels and prediction results of the initial matching model, iteratively updating the initial matching model based on the loss function, and when the loss function of the initial matching model meets a preset condition, a training of the matching model being completed. The preset condition may include that the loss function converges, a count of iterations reaches a set value, etc.

In some embodiments of the present disclosure, by means of the trained matching model, the fault information and the abnormality information are analyzed to predict the estimated total matching degree of the tooling parts corresponding to the modified tooling, which in turn facilitates the determination of the subsequent inspection instruction for the tooling parts or the modified tooling.

The inspection instruction is an instruction that directs the tooling inspection equipment to inspect the modified tooling and/or the tooling parts. The tooling inspection equipment may include a coordinate measuring machine, a laser tracker, a laser scanner, and so on.

In some embodiments, the inspection instruction includes a tooling inspection equipment to be used, an intensity of the inspection, a count of inspections, etc.

In some embodiments, the processor determines the inspection intensity and the count of inspections based on the total matching degree of the modified tooling, the lower the total matching degree, the higher the inspection intensity, and the higher the count of inspections.

In some embodiments, the processor queries the tooling inspection equipment used for the modified tooling of the same type in the historical data based on the type of the modified tooling, and counts the queried tooling inspection equipment as part of the inspection instruction.

In some embodiments of the present disclosure, based on the matching degree of all the tooling parts constituting the modified tooling, the total matching degree of the modified tooling can be determined to be more in line with reality, and then a reasonable assessment can be made as to whether or not the modified tooling applies to the target aircraft, and the adjust the parameters related to the subsequent inspection of the tooling to effectively reduce the probability of misinspection and missed inspection.

In some embodiments, the processor controls the tooling inspection equipment to inspect the modified tooling to obtain inspection information and compares the inspection information with the design model to generate a comparison result. More descriptions regarding the design model may be found elsewhere in the present disclosure.

The inspection information refers to information collected in the process of inspection of the modified tooling by the tooling inspection equipment, for example, dimensional information of the modified tooling, laser point cloud information, image information, etc.

In some embodiments, the process of comparing the inspection information and the design model includes that: the processor extracts visual information characterizing at least one tooling part corresponding to the modified tooling in the inspection information, performs coordinate coincidence on the visual information with a projection image of at least one angle in the design model to confirm the comparison result.

The visual information is information that can be visually observed to characterize a tooling part, such as color images, grayscale images, and laser point cloud images of the tooling part.

The coordinate coincidence refers to aligning a coordinate of a vertex of a tooling part in the visual information with a coordinate of a same vertex of a same tooling part in the design model.

The comparison result is data reflecting a deviation in data such as a dimension or a coordinate between a tooling part and the design model. In some embodiments, the comparison result includes a distance between the coordinate of the vertex of the tooling part and the coordinate of the same vertex of the same tooling part in the design model.

In some embodiments, the processor displays the comparison result on an interactive system. More descriptions regarding the interactive system may be found elsewhere in the present disclosure, e.g., FIG. 3.

In some embodiments, in response to the comparison result not satisfying a predetermined comparison condition, the processor generates a third machining instruction to control the numerically controlled machining apparatus to machine a specific region of the modified tooling.

In some embodiments, the predetermined comparison condition includes that the distance between the coordinate of the vertex of the tooling part and the coordinate of the same vertex of the same tooling part in the design model is not greater than a distance threshold. The distance threshold may be pre-set based on historical experience.

The third machining instruction is an instruction that controls the numerically controlled machining apparatus to machine the specific region of the modified tooling. The specific region refers to a region where the tooling part is located that does not satisfy the predetermined comparison condition in the comparison result.

In some embodiments, the third machining instruction includes the specific region and a re-machining parameter. The re-machining parameter is a parameter for re-machining the specific region, including a target tool to be used and a motion parameter of the target tool.

In some embodiments of the present disclosure, the inspection information collected by the inspection equipment and the design model are compared, and a magnitude of an error caused by the machining or assembly of the tooling parts can be precisely analyzed, so that rework can be arranged in time.

In some embodiments, in response to the comparison result not satisfying the predetermined comparison condition, the processor also generates the re-machining parameter based on the matching degree of the tooling part, the total matching degree of the modified tooling, candidate machining parameters, and the comparison result.

The candidate machining parameter is a re-machining parameter to be determined. In some embodiments, the processor selects, based on the type of the modified tooling, a plurality of re-machining parameters actually used by the modified tooling of the same type in the historical data, and determines the plurality of re-machining parameters as a plurality of candidate machining parameters.

In some embodiments, the processor also determines, based on the matching degree of the tooling part, the total matching degree of the modified tooling, the plurality of candidate machining parameters, and the comparison result, a machining score for each candidate machining parameter by a parameter model, and determines a candidate machining parameter having a machining score that satisfies a filter condition as the re-machining parameter. For example, the filter condition includes, a highest machining score, etc.

The machining score characterizes the quality of the modified tooling after re-machining the modified tooling based on the candidate machining parameters. In some embodiments, the machining score is represented by a value of 0 to 1. The closer the value is to 1, the higher the quality of the modified tooling after re-machining.

In some embodiments, the parameter model is a machine learning model. For example, the parameter model may include any one or a combination of a neural networks (NN) model or other customized model structures.

In some embodiments, the processor trains the parameter model by gradient descent, etc., based on a large number of second training samples with second labels. The second training sample includes a sample total matching degree corresponding to a sample tooling, a sample candidate machining parameter, a sample comparison result, and sample matching degrees of the sample tooling parts corresponding to the sample tooling, and the second label of the second training sample is a machining score for the sample tooling after machining the sample tooling based on the sample candidate machining parameter. In some embodiments, the second training samples are obtained based on historical data.

In some embodiments, the processor determines the second labels based on historical data. For example, after machining the sample tooling based on the sample candidate machining parameters, the second label is 0 if the actual inspection result of the sample tooling is a failure, and the second label is 1 if the actual inspection result of the sample tooling is a passing result.

In some embodiments, a training process of the parameter model is similar to the training process of the matching model, please refer to the training process of the matching model.

In some embodiments of the present disclosure, the trained parameter model allows for determining a more reasonable re-machining parameter and reducing a rate of defective products.

It should be understood that the above is only an example, and does not constitute any limitation on the technical solution of the present disclosure, and the person skilled in the art can set it up based on the needs in the practical application, and no limitation is made here.

It is not difficult to find out through the above description that the present embodiment is to make a modificationable description of the technical condition of the existing tooling by generating the tooling change order to correlate the content of the tooling modification with the target aircraft's modified design plan and to improve the matching degree between the tooling modification and the target aircraft's modified design plan. At the same time, a modified tooling bill of materials, including the modification information of the tooling and the hierarchical relationship between the corresponding materials, is generated, which improves the matching degree between the tooling and the modified design plan of the target aircraft. By establishing the association relationship between the modified manufacturing bill of materials and the modified tooling bill of materials, the modifying process of the process equipment and the manufacturing process of the aerospace product are effectively correlated to ensure that the relevant process requirements for the tooling match the design requirements of the corresponding aerospace product manufacturing, resulting that the modified tooling has a higher matching degree with the modified design plan of the target aircraft, which improves the quality and efficiency of the overall development of the aircraft.

Figure 3:
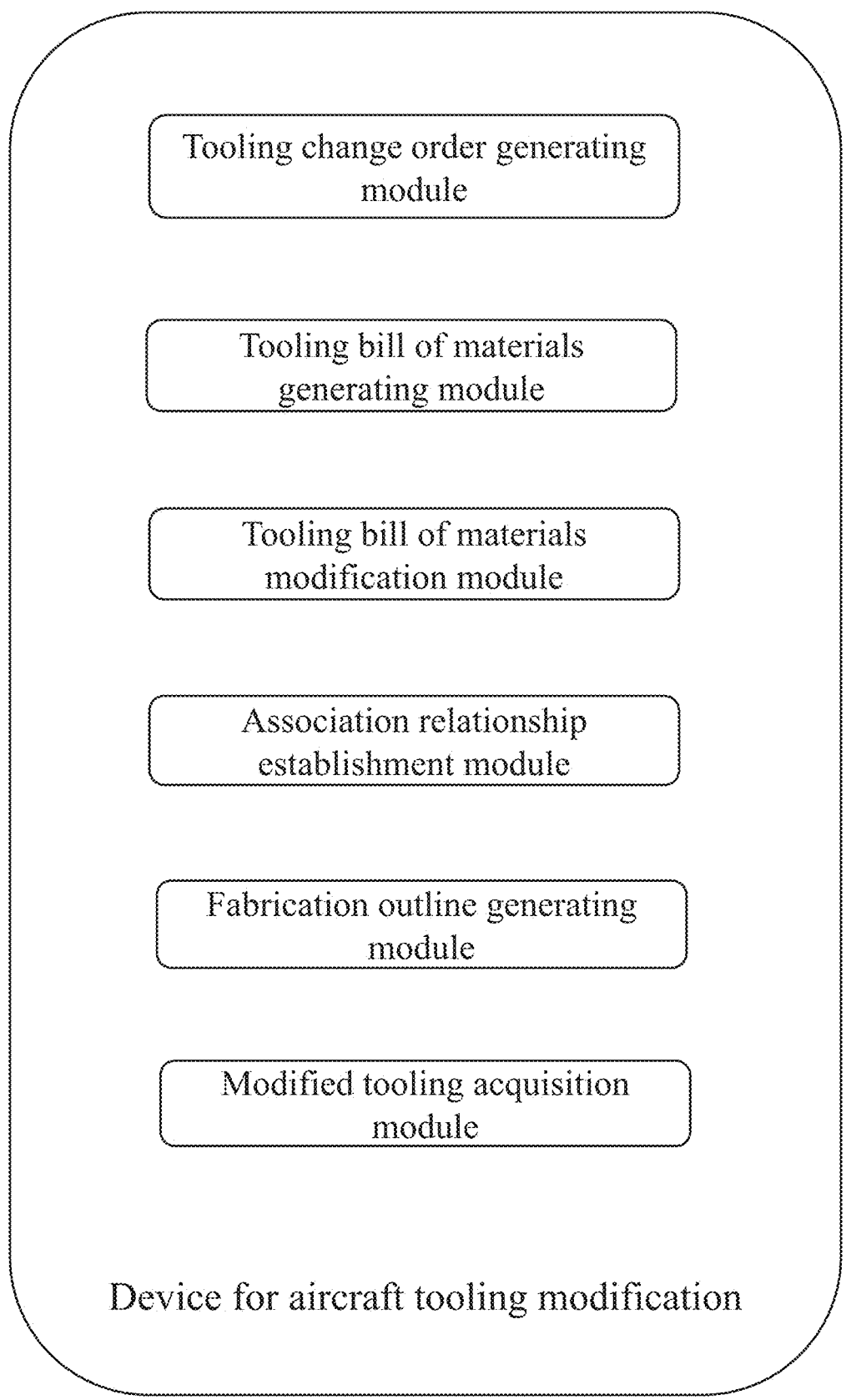
FIG. 3 is a schematic diagram illustrating exemplary functional modules of a device for aircraft tooling modification according to some embodiments of the present disclosure.
Figure 4:
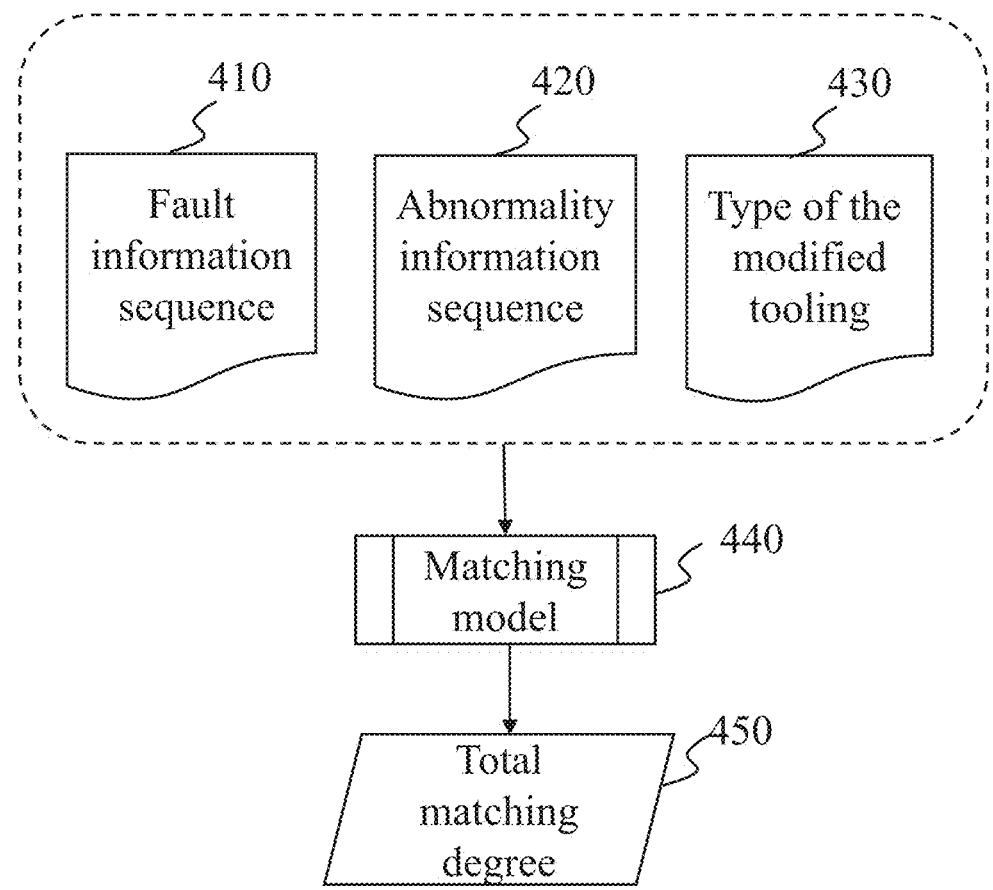
FIG. 4 is a schematic diagram illustrating an exemplary matching model according to some embodiments of the present disclosure.

FIG. 3 is a schematic diagram illustrating exemplary functional modules of a device for aircraft tooling modification according to some embodiments of the present disclosure.

Referring to FIG. 3, based on the same inventive idea, embodiments of the present disclosure further provide the device for aircraft tooling modification. The device for aircraft tooling modification includes a tooling change order generating module, a tooling bill of materials generating module, a tooling bill of materials modification module, an association relationship establishment module, a fabrication outline generating module, and a modified tooling acquisition module.

The tooling change order generating module is configured to generate, based on a modified design plan of a target aircraft, a tooling change order and a modified manufacturing bill of material. The modified design plan includes plans for a plurality of toolings.

The tooling bill of materials generating module is configured to perform, based on an initial design plan for the target aircraft, a tooling design for the tooling to obtain a design model, and obtain, based on the design model and a structural relationship of the tooling, a tooling bill of materials.

The tooling bill of materials modification module is configured to modify, based on the tooling change order, the tooling bill of materials to obtain a modified tooling bill of materials. The tooling bill of materials is generated based on an initial design plan for the target aircraft.

The association relationship establishment module is configured to establish an association relationship between the modified manufacturing bill of materials and the modified tooling bill of materials.

The fabrication outline generating module is configured to generate, based on the association relationship and the modified tooling bill of materials, a fabrication outline.

The modified tooling acquisition module is configured to obtain a modified tooling based on the fabrication outline.

In some embodiments, the device for aircraft tooling modification device further includes an interactive system and an alert system.

The interactive system is a group of related devices that interact with a technician. In some embodiments, the interactive system includes a display, a touch panel, etc.

In some embodiments, the interactive system displays the design model and recognizes the technician's interaction commands (e.g., gestures, click-touch, etc.) to display or label information on the design model. More descriptions regarding the design model may be found elsewhere in the present disclosure, e.g., FIG. 2.

In some embodiments, the alert system may include an alarm, etc. The alert system alerts (e.g., by sending out directional sound waves, etc.) when a tooling part cannot be assembled.

It is to be noted that each module in the device for aircraft tooling modification in the present embodiment corresponds one to one with each step in the method for aircraft tooling modification in the foregoing embodiment, and therefore the specific implementation of the present embodiment can be referred to the implementation of the method for aircraft tooling modification as described previously, and will not be repeated here.

Additionally, embodiments of the present disclosure further provide a computer device, the computer device including a processor and a memory. The memory stores a computer program. The processor executes the computer program to implement the method of the preceding embodiment.

Additionally, embodiments of the present disclosure further provide a computer storage medium, the computer storage medium having a computer program stored thereon, the computer program being run by a processor to implement the steps of the method of the preceding embodiment.

In some embodiments, the computer-readable storage medium may be a memory such as FRAM, ROM, PROM, EPROM, EEPROM, flash memory, magnetic surface memory, optical disk, or CD-ROM; or it may be a memory that includes one of the foregoing memory or any combination thereof. The computer may be a variety of computing devices including smart terminals and servers.

In some embodiments, the executable instructions may be in the form of a program, software, software module, script, or code, written in any form of programming language, including a compiled or interpreted language, or a declarative or procedural language, and which may be deployed in any form, including being deployed as a stand-alone program or being deployed as a module, a component, a subroutine, or other unit suitable for use in a computing environment.

For example, the executable instructions may, but do not necessarily, correspond to a file in a file system, and may be stored in a portion of a file holding other programs or data, e.g., in one or more scripts stored in a hypertext markup language (HTML) document, in a single file dedicated to the program discussed, or in multiple synergistic files (e.g., files that store one or more modules, subroutines, or code sections).

For example, the executable instructions may be deployed to be executed on a single computing device, or on a plurality of computing devices located at a single location, or, alternatively, on a plurality of computing devices distributed across a plurality of locations and interconnected via a communication network.

It should be noted that, as used herein, the terms "including", "comprising", or any other variation thereof, are intended to cover non-exclusive inclusion, such that a process, method, article or system comprising a set of elements includes not only those elements, but also other elements not explicitly listed, or elements that are inherent to such a process, method, article, or system. In the absence of further qualification, the elements qualified by the statement "including a . . . " qualifies the existence of another identical element in the process, method, article, or system that includes that element.

The above serial numbers of the embodiments of the present disclosure are for descriptive purposes only, and do not represent the merits of the embodiments.

Through the above description of the embodiments, it is clear to those skilled in the art that the method of the above embodiments can be realized with the aid of software and the necessary general hardware platform, or of course with hardware, but in many cases the former is the preferred method. Based on this understanding, the technical solution of the present disclosure may be embodied essentially or in part as a contribution to the prior art in the form of a software product that is stored in a storage medium (e.g., read-only/random-access memory, a disk, a CD-ROM), and that comprises a number of commands to cause a multimedia terminal device (which may be a cellular phone, a computer, a television receiver, a network device, etc.) to perform the method described in various embodiments of the present disclosure.

The above is only a preferred embodiment of the present disclosure, and does not limit the scope of the present disclosure, and all the equivalent structures or equivalent process transformations utilizing the contents of the present disclosure and the accompanying drawings, or applying them directly or indirectly in other related technical fields, are similarly included in the scope of the present disclosure.

What is claimed is:

1. A method for aircraft tooling modification, comprising:
generating, based on a modified design plan of a target aircraft, a tooling change order and a modified manufacturing bill of materials, including:
generating, based on the modified design plan of the target aircraft, an engineering change order and the modified manufacturing bill of materials;
evaluating, based on the engineering change order, a tooling of the target aircraft and generating a manufacturing change order; and
generating, based on the manufacturing change order, the tooling change order, wherein the modified design plan includes plans for a plurality of toolings, the tooling change order includes modification information for making modification to a technical condition of an existing tooling, and the modification information is obtained by analyzing and extracting information from the modified design plan of the target aircraft;
performing, based on an initial design plan for the target aircraft, a tooling design for the tooling to obtain a design model;
obtaining, based on the design model and a structural relationship of the tooling, a tooling bill of materials;
modifying, based on the tooling change order, the tooling bill of materials to obtain a modified tooling bill of materials, wherein the tooling bill of materials is generated based on the initial design plan for the target aircraft;
establishing an association relationship between the modified manufacturing bill of materials and the modified tooling bill of materials;
generating, based on the association relationship and the modified tooling bill of materials, a fabrication outline, including:
obtaining a tooling structure tree by listing a tooling top level node in the modified tooling bill of materials and a tooling node used under the tooling top level node; and
generating the fabrication outline based on an unfolded tooling structure tree and the association relationship; and
obtaining a modified tooling based on the fabrication outline.

2. The method of claim 1, wherein the obtaining a modified tooling based on the fabrication outline, includes:
sending a first machining instruction to a manipulator and a numerically controlled machining apparatus via a processor in a computer based on the fabrication outline for controlling the manipulator to grip and hold a tooling material, and controlling the numerically controlled machining apparatus to perform rough and finish machining to the tooling material to manufacture a tooling part; and
sending a first assembly instruction to the manipulator and automated assembly equipment via the processor based on the fabrication outline for controlling the manipulator to clamp the tooling part and to adjust a position and an angle of the tooling part, and controlling the automated assembly equipment to assemble the tooling part to obtain the modified tooling.

3. The method of claim 2, wherein the obtaining a modified tooling based on the fabrication outline, includes:
generating tooling sequencing information based on the fabrication outline;
sending a second machining instruction to the manipulator and the numerically controlled machining apparatus via the processor based on the tooling sequencing information for controlling the manipulator to clamp and hold the tooling material based on the tooling sequencing information, and controlling the numerically controlled machining apparatus to perform the rough machining and the finish machining of the tooling material based on the tooling sequencing information to manufacture the tooling part; and
sending a second assembly instruction to the manipulator and the automated assembly equipment via the processor based on the tooling sequencing information for controlling the manipulator to clamp the tooling part and adjust the position and angle of the tooling part in accordance with the tooling sequencing information, and controlling the automated assembly equipment to assemble the tooling part in accordance with the tooling sequencing information to obtain the modified tooling.

4. The method of claim 1, wherein the establishing an association relationship between the modified manufacturing bill of materials and the modified tooling bill of materials, includes:
obtaining a material association rule based on material information in the modified manufacturing bill of materials; and
establishing the association relationship based on the material association rule.

5. The method of claim 1, wherein the modified manufacturing bill of materials includes parts of the tooling, assemblies, and a manufacturing process for an end product.

6. The method of claim 1, wherein after obtaining the modified tooling based on the fabrication outline, the method further comprises:
inspecting the modified tooling based on the modified design plan to obtain an inspection result; and
if the inspection result is qualified, registering the modified tooling in a warehouse.

7. The method of claim 6, wherein the inspecting the modified tooling based on the modified design plan includes:
controlling tooling inspection equipment to inspect the modified tooling to obtain inspection information, comparing the inspection information with the design model, and generating a comparison result.

8. The method of claim 6, wherein after inspecting the modified tooling based on the modified design plan, the method further comprises:
if the inspection result is unqualified, generating the tooling change order to modify the modified tooling.

9. A device for aircraft tooling modification, comprising:
a tooling change order generating module configured to generate, based on a modified design plan of a target aircraft, a tooling change order and a modified manufacturing bill of materials, wherein to generate, based on the modified design plan of the target aircraft, the tooling change order and the modified manufacturing bill of material, the tooling change order generating module is further configured to:

generate, based on the modified design plan of the target aircraft, an engineering change order and the modified manufacturing bill of materials;

evaluate, based on the engineering change order, a tooling of the target aircraft and generate a manufacturing change order; and generate, based on the manufacturing change order, the tooling change order, wherein the modified design plan includes plans for a plurality of toolings, the tooling change order includes modification information for making modification to a technical condition of an existing tooling, and the modification information is obtained by analyzing and extracting information from the modified design plan for the target aircraft;

a tooling bill of materials generating module configured to perform, based on an initial design plan for the target aircraft, a tooling design for the tooling to obtain a design model, and obtain, based on the design model and a structural relationship of the tooling, a tooling bill of materials;

a tooling bill of materials modification module configured to modify, based on the tooling change order, the tooling bill of materials to obtain a modified tooling bill of materials, wherein the tooling bill of materials is generated based on the initial design plan for the target aircraft;

an association relationship establishment module configured to establish an association relationship between the modified manufacturing bill of materials and the modified tooling bill of materials;

a fabrication outline generating module configured to generate, based on the association relationship and the modified tooling bill of materials, a fabrication outline, wherein to generate, based on the association relationship and the modified tooling bill of materials, the fabrication outline, the fabrication outline generating module is further configured to:

obtain a tooling structure tree by listing a tooling top level node in the modified tooling bill of materials and a tooling node used under the tooling top level node; and generate the fabrication outline based on an unfolded tooling structure tree and the association relationship;

a modified tooling acquisition module configured to obtain a modified tooling based on the fabrication outline.

10. A computer device comprising a memory and a processor, wherein the memory stores a computer program, and the processor executes the computer program to implement the method of claim 1.

* * * * *